(12) United States Patent
Yoshida et al.

(10) Patent No.: US 11,460,727 B2
(45) Date of Patent: *Oct. 4, 2022

(54) DISPLAY DEVICE

(71) Applicant: Japan Display Inc., Tokyo (JP)

(72) Inventors: Koji Yoshida, Tokyo (JP); Hirofumi Ohira, Tokyo (JP); Soichiro Ohama, Tokyo (JP); Toshihiko Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/382,581

(22) Filed: Jul. 22, 2021

(65) Prior Publication Data

US 2021/0356803 A1 Nov. 18, 2021

Related U.S. Application Data

(63) Continuation of application No. 16/773,470, filed on Jan. 27, 2020, now Pat. No. 11,073,713.

(30) Foreign Application Priority Data

Jan. 29, 2019 (JP) .............................. JP2019-013622

(51) Int. Cl.
*G02F 1/1333* (2006.01)
*G02F 1/1362* (2006.01)

(52) U.S. Cl.
CPC .. *G02F 1/133382* (2013.01); *G02F 1/136286* (2013.01); *G02F 2202/36* (2013.01)

(58) Field of Classification Search
CPC ......... G02F 1/136209; G02F 1/136286; G02F 1/133382; G02F 1/13338
See application file for complete search history.

(56) References Cited

U.S. PATENT DOCUMENTS

| 10,521,044 | B2 | 12/2019 | Fujisawa et al. |
| 11,073,713 | B2 * | 7/2021 | Yoshida ............ G02F 1/133382 |
| 2014/0175445 | A1 * | 6/2014 | Cai ................... G02F 1/136209 |
| | | | 257/70 |
| 2015/0192814 | A1 | 7/2015 | Kosugi et al. |
| 2016/0126257 | A1 | 5/2016 | Cao et al. |
| 2016/0306169 | A1 | 10/2016 | Nambara |
| 2020/0201109 | A1 | 6/2020 | Zhao et al. |

FOREIGN PATENT DOCUMENTS

| JP | 2015210328 A | 11/2015 |
| JP | 2016051090 A | 4/2016 |

* cited by examiner

*Primary Examiner* — Dung T Nguyen
(74) *Attorney, Agent, or Firm* — K&L Gates LLP

(57) ABSTRACT

According to an aspect, a display device includes: a substrate having a display region; a shield conductive layer provided above the substrate; and a plurality of wiring units for temperature detection disposed at positions overlapping with the display region and the shield conductive layer when seen in a plan view. Each wiring unit for temperature detection has one end coupled to a first wire and the other end coupled to a second wire to detect resistance that changes in accordance with a change in temperature, between the first wire and the second wire.

6 Claims, 9 Drawing Sheets

DISPLAY DEVICE

CROSS-REFERENCE TO RELATED APPLICATIONS

This application is a continuation of U.S. patent application Ser. No. 16/773,470, filed on Jan. 27, 2020, which application claims priority from Japanese Application No. 2019-013622, filed on Jan. 29, 2019, the contents of which are incorporated by reference herein in its entirety.

BACKGROUND

1. Technical Field

The present disclosure relates to a display device.

2. Description of the Related Art

A display device that projects images on a translucent member, such as glass, is known as a so-called head-up display (HUD), which is disclosed in Japanese Patent Application Laid-open Publication No. 2015-210328 (JP-A-2015-210328), for example.

According to the technology of JP-A-2015-210328, the display device may introduce sunlight through an optical system. If sunlight collected by the optical system strikes the display device, the display device may deteriorate.

Japanese Patent Application Laid-open Publication No. 2016-051090 (JP-A-2016-051090) discloses a liquid crystal display device including a temperature sensor disposed outside a display region. Since the incident state of sunlight changes with a relative position between the sun and the display device, the temperature sensor described in JP-A-2016-051090, which is disposed outside the display region, may fail to detect the sunlight collected by the optical system.

For the foregoing reasons, there is a need for a display device that can detect a partially heated state of a display region.

SUMMARY

According to an aspect, a display device includes: a substrate having a display region; a shield conductive layer provided above the substrate; and a plurality of wiring units for temperature detection disposed at positions overlapping with the display region and the shield conductive layer when seen in a plan view. Each wiring unit for temperature detection has one end coupled to a first wire and the other end coupled to a second wire to detect resistance that changes in accordance with a change in temperature, between the first wire and the second wire.

DETAILED DESCRIPTION

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the figures, components similar to those previously described with reference to previous figures are denoted by like reference signs, and detailed explanation thereof may be appropriately omitted. In this disclosure, when an element A is described as being "on" another element B, the element A can be directly on the other element B, or there can be one or more elements between the element A and the other element B.

First Embodiment

Figure 1:
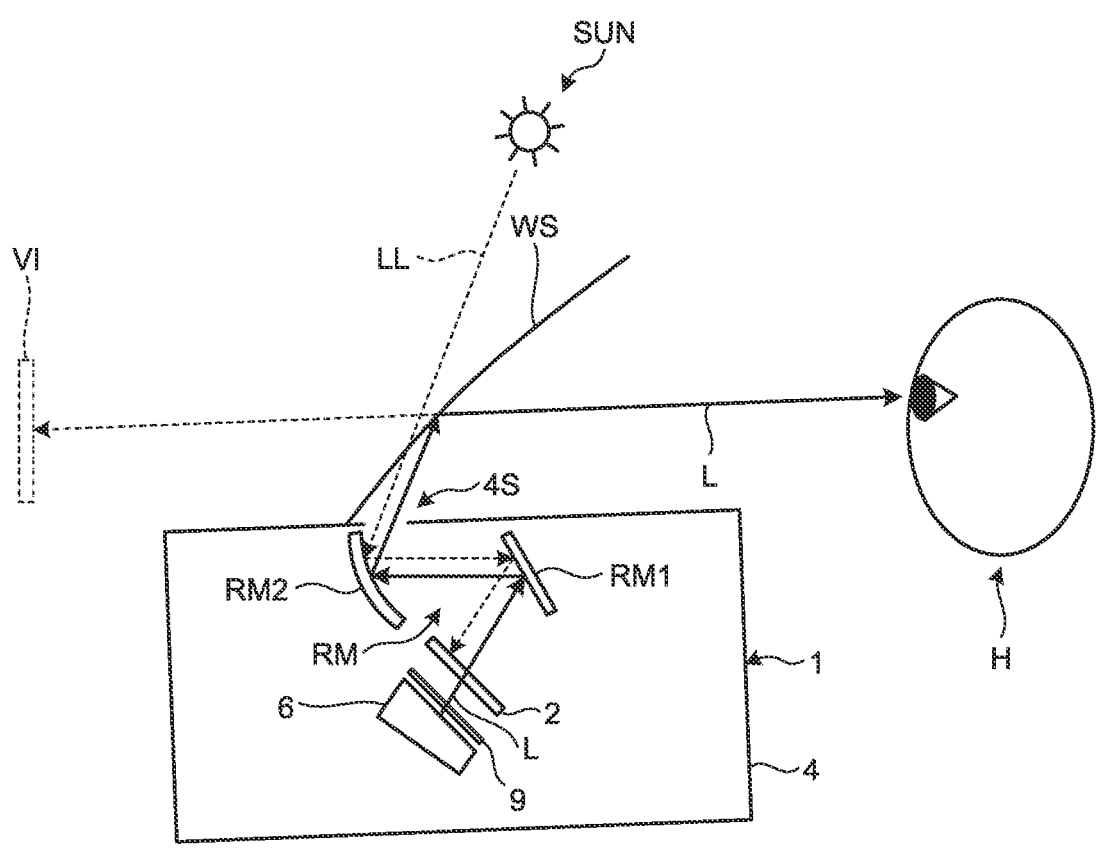
FIG. 1 is a diagram for schematically explaining a head-up display.

FIG. 1 is a diagram for schematically explaining a head-up display. A head-up display (hereinafter referred to as HUD) device 1 includes a backlight 6, a diffuser 9, a display device 2, a windshield WS, and an optical system RM that enlarges and projects an image from the display device 2 onto the windshield WS.

A housing 4 houses the backlight 6 serving as a light source device, the display device 2 that outputs an image using light L from the backlight 6 as the light source, the diffuser 9 provided between the display device 2 and the backlight 6, and the optical system RM. The light L emitted from the backlight 6 is diffused by the diffuser 9, and partially or entirely transmitted through the display device 2. The light L is then reflected by the optical system RM and the windshield WS and reaches a user H. The user H recognizes the light L as an image VI within the field of view of the user H. In other words, the display device 2 according to a first embodiment functions as the HUD device 1 including the optical system RM and the windshield WS. The windshield WS may be any translucent member disposed on the line of sight of the user H, and may be, for example, glass of a front windshield of a vehicle.

The optical system RM of the HUD device 1 according to the first embodiment includes a mirror RM1 and a mirror RM2 that guide the light L transmitted through the display device 2. The mirror RM1 is a plane mirror and the mirror RM2 is a concave mirror. The mirror RM1 may also be a concave mirror. The optical system RM is not limited to this structure, and may be configured by a single mirror or three or more mirrors.

Figure 2:
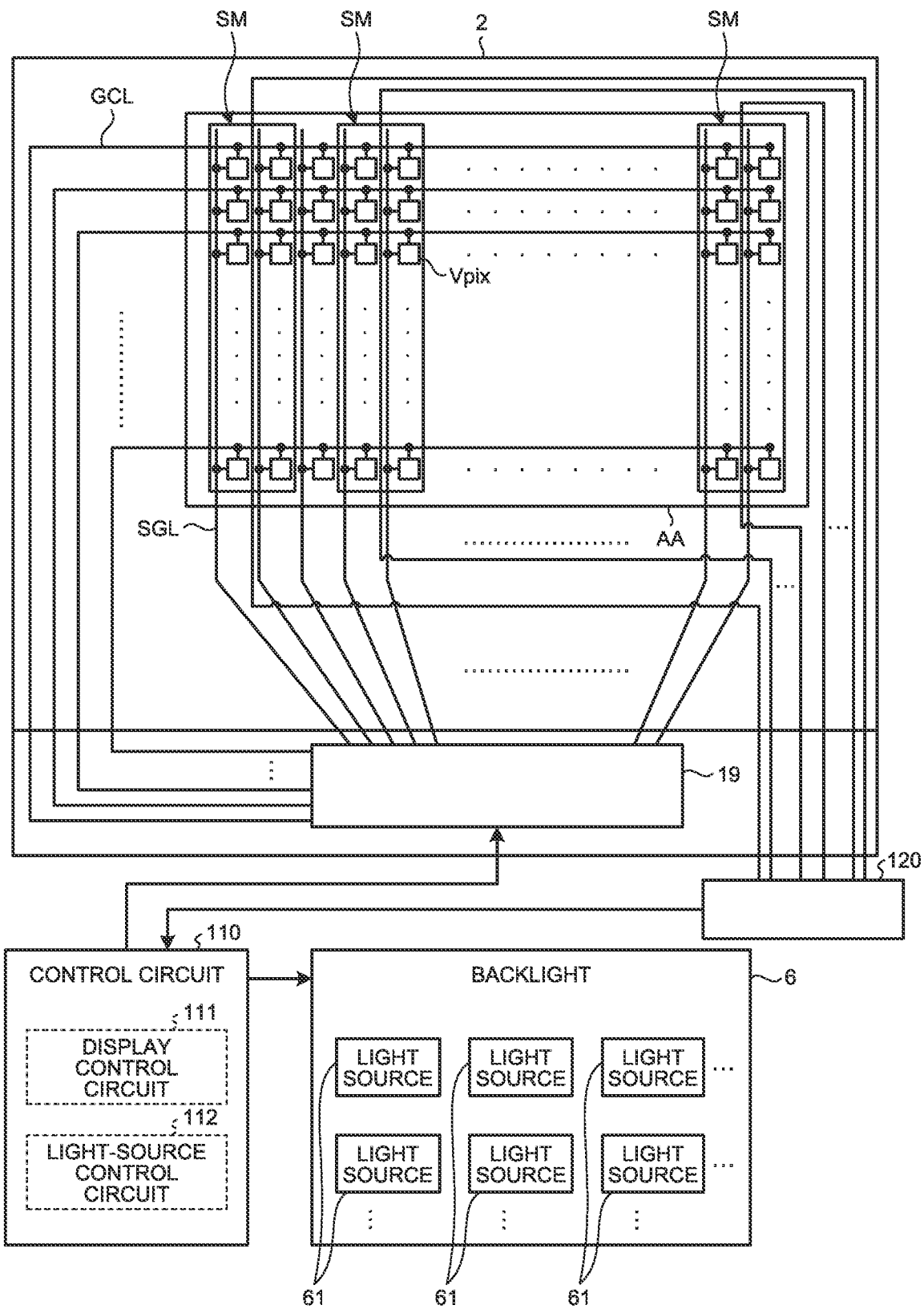
FIG. 2 is a diagram for schematically explaining a display device.
Figure 3:
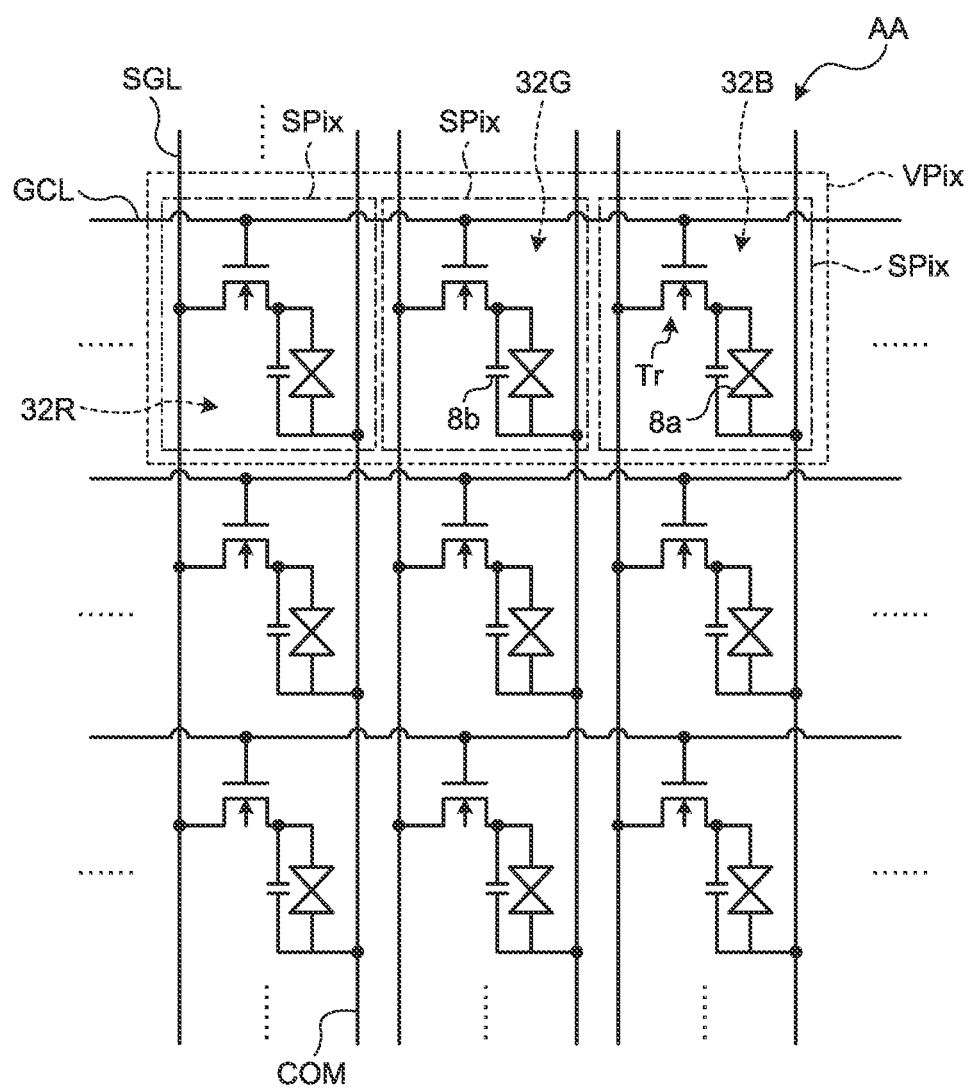
FIG. 3 is a diagram for explaining pixels of the display device.
Figure 4:
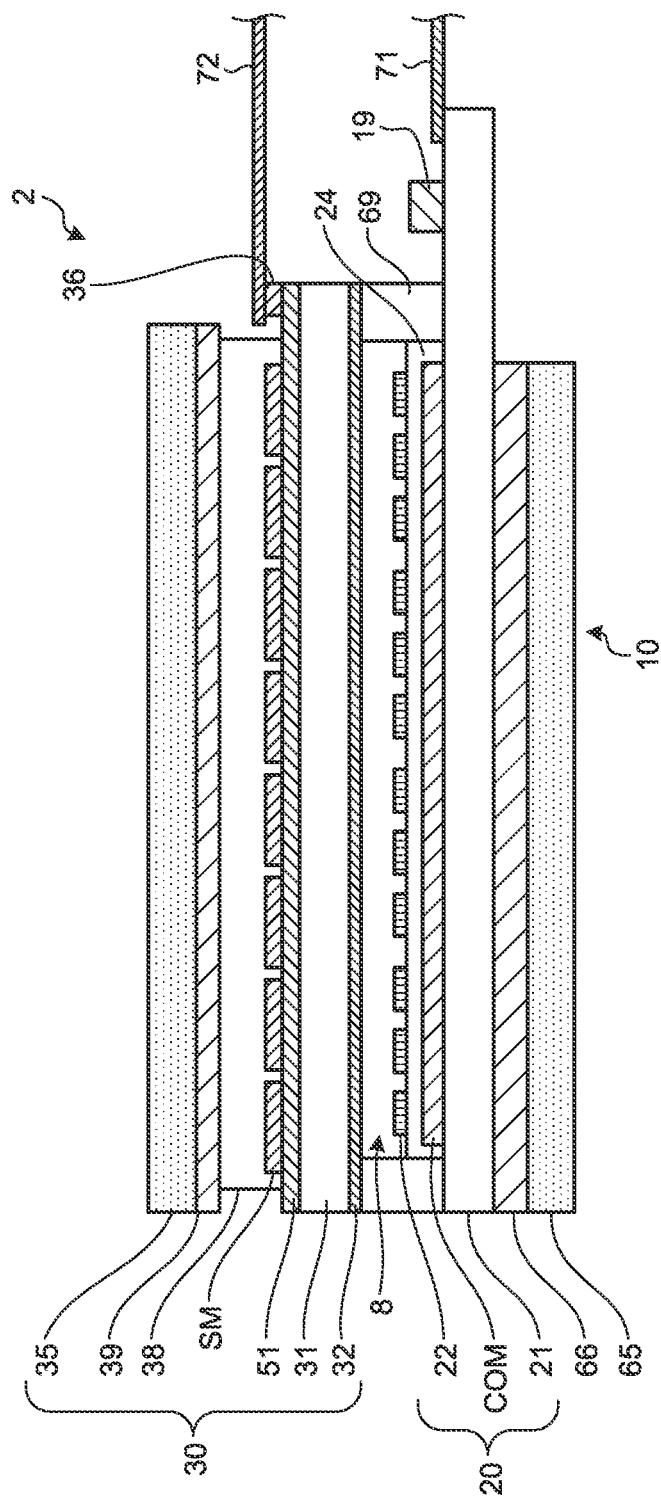
FIG. 4 is a schematic sectional view of the display device.
Figure 5:
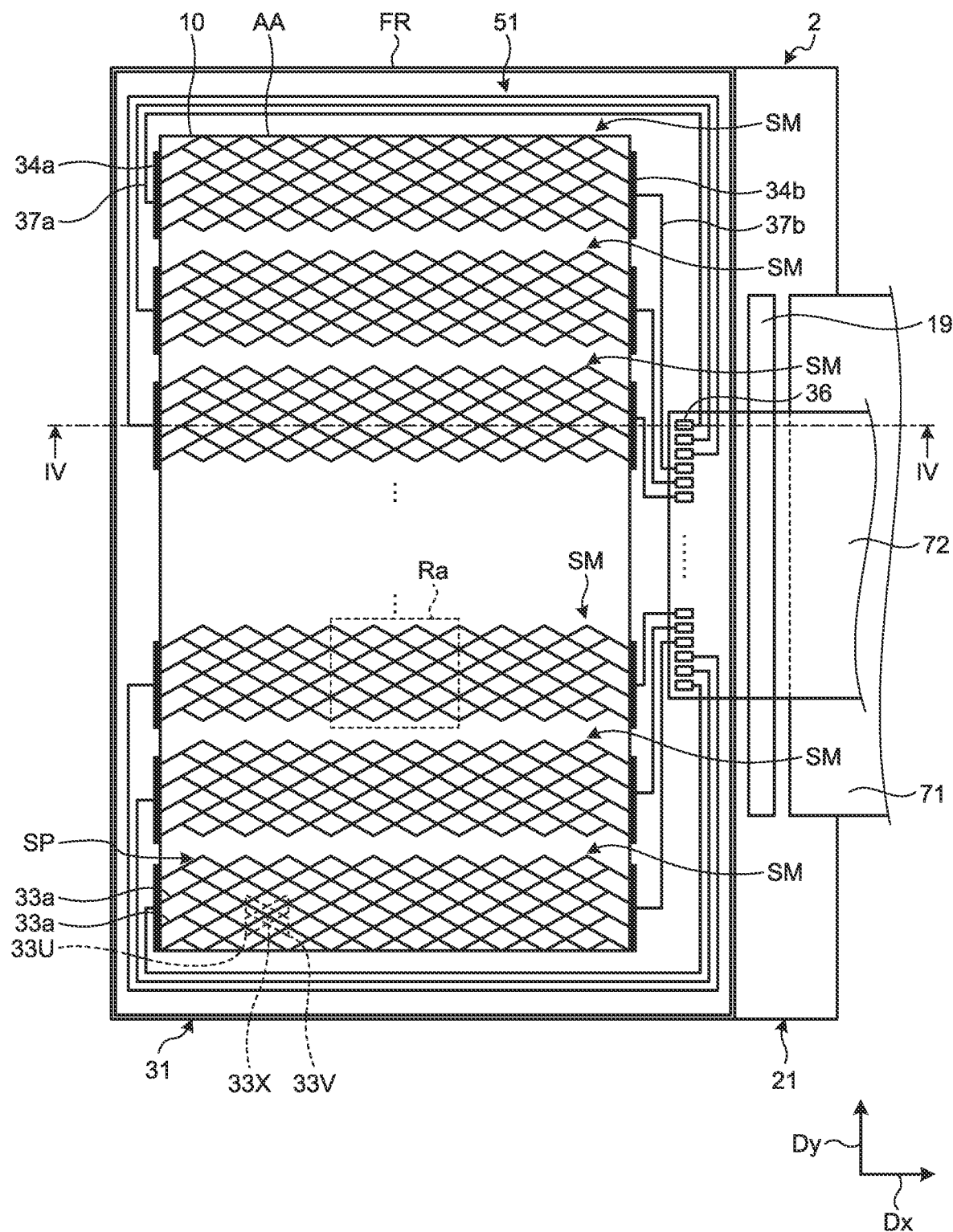
FIG. 5 is a plan view for explaining the arrangement of wiring units for temperature detection.

The following describes the display device 2. FIG. 2 is a diagram for schematically explaining the display device. FIG. 3 is a diagram for explaining pixels of the display device. FIG. 4 is a schematic sectional view of the display device. FIG. 5 is a plan view for explaining the arrangement of wiring units for temperature detection. The display device 2 according to the first embodiment is a transmissive liquid crystal display that outputs an image by using the light L emitted from the light source. The display device 2 includes a display driver integrated circuit (DDIC) 19.

The display device 2 is also called as a display panel. As illustrated in FIG. 2, the display device 2 has a display region AA, in which a plurality of pixels VPix are arranged in a matrix (row-column configuration).

As illustrated in FIG. 3, each pixel VPix includes a plurality of sub-pixels SPix. Each sub-pixel SPix includes a switching element Tr and a liquid crystal capacitor 8a. The switching element Tr is a thin film transistor (TFT). In this example, the switching element Tr is an n-channel metal oxide semiconductor (MOS) TFT. An insulating layer 24 is provided between a pixel electrode 22 and a common electrode COM, and a holding capacitor 8b illustrated in FIG. 3 is formed by these elements.

As illustrated in FIG. 2, a control circuit 110 functions as, for example, a display control circuit 111 and a light-source control circuit 112. The display control circuit 111 outputs, to the DDIC 19, signals such as a master clock signal, a horizontal synchronizing signal, a vertical synchronizing signal, a pixel signal, and a drive command signal for driving the backlight 6. The pixel signal is a signal combining gradation values of, for example, red (R), green (G), and blue (B). The display control circuit 111 controls the output gradation values of part or all of the pixels in accordance with the amount of light emitted from light sources 61 controlled by the light-source control circuit 112. The light-source control circuit 112 controls the operation of the light sources 61 in synchronization with the pixel signals.

The switching elements Tr of the respective sub-pixels SPix illustrated in FIG. 3, signal lines SGL, and gate lines GCL, for example, are formed on a first substrate 21 (see FIG. 4). The signal lines SGL are wiring for supplying the pixel signals to pixel electrodes 22 illustrated in FIG. 4. The gate lines GCL are wiring for supplying drive signals to the switching elements Tr. The signal lines SGL and the gate lines GCL extend along a plane parallel to the surface of the first substrate 21.

The DDIC 19 illustrated in FIG. 2 sequentially selects the gate lines GCL as a gate driver. The DDIC 19 applies a scan signal to the gate of the switching element Tr in the sub-pixel SPix through the selected gate line GCL. In this manner, the sub-pixels SPix are sequentially selected row by row (by each horizontal line).

The DDIC 19 supplies the pixel signals to the sub-pixels SPix included in the selected horizontal line through the signal lines SGL as a source driver. The sub-pixels SPix display an image on a horizontal line-by-horizontal line basis in accordance with the provided pixel signal.

The DDIC 19 applies a common potential to the common electrode COM as a common electrode driver. The common potential is a direct-current voltage signal applied in common to the sub-pixels SPix.

As described above, the DDIC 19 functions as the gate driver, the source driver, and the common electrode driver. The DDIC 19 may have separate configurations of the gate driver, the source driver, and the common electrode driver. Alternatively, at least one of the gate driver, the source driver, and the common electrode driver may be formed on the first substrate 21 by using the TFTs.

A color filter 32 illustrated in FIG. 3 may have color regions colored in, for example, red (R), green (G), and blue (B) that are periodically arranged. Color regions 32R, 32G, and 32B having the colors of R, G, and B, respectively, correspond to the respective sub-pixels SPix illustrated in FIG. 3 and serve as a set. A set of sub-pixels SPix corresponding to the respective color regions 32R, 32G, and 32B of the three colors constitutes a pixel VPix. The color filter 32 may include color regions of four or more colors.

As illustrated in FIG. 2, a plurality of wiring units for temperature detection SM are arrayed. Both terminals of the wiring unit for temperature detection SM are pulled out and electrically coupled to a resistance detection circuit 120. The resistance detection circuit 120 converts a resistance value of the wiring unit for temperature detection SM from analog to digital and outputs the detected resistance signal to the control circuit 110.

The following describes an exemplary configuration of the display device 2 according to the first embodiment. FIG. 4 is a schematic sectional view of the display device. As illustrated in FIG. 4, the display device 2 includes a pixel substrate 20, a counter substrate 30, and a liquid crystal layer 8 serving as a display function layer. The counter substrate 30 faces the pixel substrate 20 in a direction perpendicular to the surface of the pixel substrate 20. The liquid crystal layer 8 is provided between the pixel substrate 20 and the counter substrate 30.

The pixel substrate 20 includes the first substrate 21, the pixel electrodes 22, the common electrode COM, and a polarizing plate 65. The first substrate 21 is provided with the switching elements Tr such as the TFTs and various wiring such as the gate lines GCL and the signal lines SGL, which are not illustrated in FIG. 4.

The common electrode COM is provided on the upper side of the first substrate 21. The pixel electrodes 22 are provided on the upper side of the common electrode COM with the insulating layer 24 interposed therebetween. The pixel electrodes 22 are provided in a layer different from that of the common electrode COM and overlap with the common electrode COM in a plan view. The pixel electrodes 22 are arranged in a matrix (row-column configuration) in a plan view. The polarizing plate 65 is provided on the lower side of the first substrate 21 with an adhesive layer 66 interposed therebetween. The pixel electrodes 22 and the common electrode COM are made of a translucent conductive material, such as indium tin oxide (ITO). While the present embodiment has been described with reference to the example in which the pixel electrodes 22 are provided on the upper side of the common electrode COM, the common electrode COM may be provided on the upper side of the pixel electrodes 22.

The first substrate 21 is provided with the DDIC 19 and a flexible substrate 71. The DDIC 19 functions as the control circuit 110 illustrated in FIG. 2.

In the first embodiment, the direction perpendicular to the surface of the first substrate 21 and extending from the first substrate 21 toward a second substrate 31 is defined as the "upper side". The direction extending from the second substrate 31 toward the first substrate 21 is defined as the "lower side".

The counter substrate 30 includes: the second substrate 31; the color filter 32 formed on one surface of the second substrate 31; a shield conductive layer 51 provided on the other surface of the second substrate 31; the wiring units for temperature detection SM; a protection layer 38; an adhesive layer 39; and a polarizing plate 35. The wiring units for temperature detection SM are arrayed on the second substrate 31. The second substrate 31 is coupled to a flexible substrate 72. The wiring units for temperature detection SM are electrically coupled to the flexible substrate 72 through terminals 36. The flexible substrate 72 is coupled to the resistance detection circuit 120 illustrated in FIG. 2. The detailed configuration of the wiring units for temperature detection SM will be described later. The shield conductive layer 51 is interposed between the second substrate 31 and the wiring units for temperature detection SM in a direction perpendicular to the surface of the second substrate 31.

The wiring units for temperature detection SM include first conductive thin wires 33U and second conductive thin wires 33V. The protection layer 38 is provided on the wiring units for temperature detection SM to protect the wiring units for temperature detection SM including the first conductive thin wires 33U and the second conductive thin wires 33V. The protection layer 38 can be made of a translucent resin, such as an acrylic resin. The polarizing plate 35 is provided above the protection layer 38 with the adhesive layer 39 interposed therebetween. The adhesive layer 39 is an insulating layer having a higher resistance value than that of the wiring units for temperature detection SM.

The shield conductive layer 51 is a translucent conductive layer and is made of, for example, ITO, indium zinc oxide (IZO), tin oxide (SnO), or an organic conductive film. The shield conductive layer 51 may employ, for example, an oxide layer composed mostly of tin oxide ($SnO_2$) and silicon dioxide ($SiO_2$), an oxide layer composed mostly of gallium oxide ($Ga_2O_3$), indium oxide ($In_2O_3$), and tin oxide ($SnO_2$), or a translucent conductive layer composed mostly of ITO and including silicon (Si).

The first substrate 21 and the second substrate 31 are spaced apart at a certain distance. The space between the first substrate 21 and the second substrate 31 is sealed with a sealing member 69. The liquid crystal layer 8 is provided in a space surrounded by the first substrate 21, the second substrate 31, and the sealing member 69. The liquid crystal layer 8 modulates light passing therethrough in accordance with the state of an electric field, and employs liquid crystals in a transverse electric field mode such as an in-plane switching (IPS) mode including a fringe field switching (FFS) mode. An orientation film, which is not illustrated, is provided between the liquid crystal layer 8 and the pixel substrate 20 and between the liquid crystal layer 8 and the counter substrate 30 illustrated in FIG. 4. In the first embodiment, the liquid crystal layer 8 is driven by a transverse electric filed generated between the pixel electrodes 22 and the common electrode COM.

The backlight 6 illustrated in FIGS. 1 and 2 is provided at the lower side of the first substrate 21. Light emitted from the backlight 6 passes through the pixel substrate 20, and is modulated in accordance with the state of liquid crystals at respective positions. The state of light transmittance toward the display surface changes depending on the positions. In this manner, the display device 2 displays an image on the display region AA.

FIG. 5 is a plan view for explaining the arrangement of the wiring units for temperature detection. FIG. 4 is a sectional view taken along line IV-IV in FIG. 5. As illustrated in FIG. 5, the wiring units for temperature detection SM according to the first embodiment each include a plurality of first conductive thin wires 33U and a plurality of second conductive thin wires 33V. The first conductive thin wires 33U and the second conductive thin wires 33V are inclined in mutually opposite directions with respect to the direction parallel to one side of the display region AA. The first conductive thin wires 33U form a first angle with a first direction Dx and the second conductive thin wires 33V form a second angle with the first direction Dx. When the first conductive thin wires 33U and the second conductive thin wires 33V need not be distinguished from each other, they are collectively referred to as conductive thin wires 33 herein below.

Each of the first conductive thin wires 33U and the second conductive thin wires 33V is a metallic wire having a narrow width. In the display region AA, the first conductive thin wires 33U are spaced apart from each other in a direction crossing the extending direction of the first conductive thin wires 33U, i.e., in a second direction Dy. The second conductive thin wires 33V are spaced apart from each other in the second direction Dy.

Each wiring unit for temperature detection SM includes at least one first conductive thin wire 33U and at least one second conductive thin wire 33V crossing the first conductive thin wire 33U. The first conductive thin wire 33U and the second conductive thin wire 33V are electrically coupled at a node 33X. When the first conductive thin wires 33U cross the second conductive thin wires 33V, the shape of a mesh formed in the wiring unit for temperature detection SM is a parallelogram.

One ends in the extending direction of the first conductive thin wires 33U and the second conductive thin wires 33V are coupled to a coupling wire 34a, and the other ends in the extending direction of the first conductive thin wires 33U and the second conductive thin wires 33V are coupled to a coupling wire 34b, the coupling wire 34a and the coupling wire 34b being disposed in a peripheral region FR. The first conductive thin wires 33U and the second conductive thin wires 33V, which are main detectors of the wiring unit for temperature detection SM, are coupled to the coupling wires 34a and 34b through third conductive thin wires 33a. The first conductive thin wires 33U and the second conductive thin wires 33V are electrically coupled to each other to function as one wiring unit for temperature detection SM.

The first conductive thin wires 33U and the second conductive thin wires 33V are made of a metal layer including one or more metals selected from aluminum (Al), copper (Cu), silver (Ag), molybdenum (Mo), chromium (Cr), titanium (Ti), and tungsten (W). Alternatively, the first conductive thin wires 33U and the second conductive thin wires 33V are made of an alloy layer including one or more metals selected from aluminum (Al), copper (Cu), silver (Ag), molybdenum (Mo), chromium (Cr), titanium (Ti), and tungsten (W). The first conductive thin wires 33U and the second conductive thin wires 33V can be made of an aluminum alloy such as AlNd, AlCu, AlSi, and AlSiCu. The first conductive thin wires 33U and the second conductive thin wires 33V may be a multilayered body of conductive layers made of these metals or a multilayered body of alloy conductive layers including one or more of these metals.

A width of each of the first conductive thin wire 33U and the second conductive thin wire 33V is preferably from 1 μm to 10 μm inclusive, and more preferably, from 1 μm to 5 μm inclusive. This is because setting the width of the first conductive thin wire 33U and the second conductive thin wire 33V to 10 μm or smaller can reduce the area covering an aperture that is a region where light transmittance is not suppressed by the gate lines GCL and the signal lines SGL in the display region AA, thereby reducing the probability of a loss of the aperture ratio. This is also because setting the width of the first conductive thin wire 33U and the second conductive thin wire 33V to 1 μm or larger stabilizes the shape of the wires, thereby lowering the probability of disconnection.

Each wiring unit for temperature detection SM includes the first conductive thin wires 33U and the second conductive thin wires 33V that are arranged at a predetermined pitch, and extends, as a whole, in a direction crossing the extending direction of the color regions 32R, 32G, and 32B of the color filter 32. In other words, the wiring unit for temperature detection SM extends in the first direction Dx crossing the signal lines SGL illustrated in FIG. 3. In order for the first conductive thin wires 33U and the second conductive thin wires 33V not to block light from reaching a specific color region of the color filter 32, the first conductive thin wires 33U and the second conductive thin wires 33V form a mesh shape such that thin wire pieces inclined in mutually opposite directions cross each other and are coupled to each other. The first conductive thin wires 33U and the second conductive thin wires 33V are inclined in the mutually opposite directions at an angle θ with respect to a direction parallel to the extending direction (second direction Dy) of the color regions 32R, 32G, and 32B. The angle θ is, for example, from 5 degrees to 75 degrees inclusive. More preferably, the angle θ is from 25 degrees to 40 degrees inclusive, and still more preferably, from 50 degrees to 65 degrees inclusive.

In this manner, the extending directions of the first conductive thin wires 33U and the second conductive thin wires 33V of the wiring unit for temperature detection SM have a certain angle with respect to the extending direction of the color regions 32R, 32G, and 32B of the color filter 32. As a result, the first conductive thin wires 33U and the second conductive thin wires 33V of the wiring unit for temperature detection SM sequentially block light from reaching the color regions 32R, 32G, and 32B of the color filter 32. This configuration can prevent lower transmittance in a specific color region of the color filter 32. The arrangement of the first conductive thin wires 33U and the second conductive thin wires 33V of the wiring unit for temperature detection SM may be varied within an acceptable range. In other words, the first conductive thin wires 33U and the second conductive thin wires 33V of the wiring unit for temperature detection SM may be arranged at different intervals.

Figure 6:
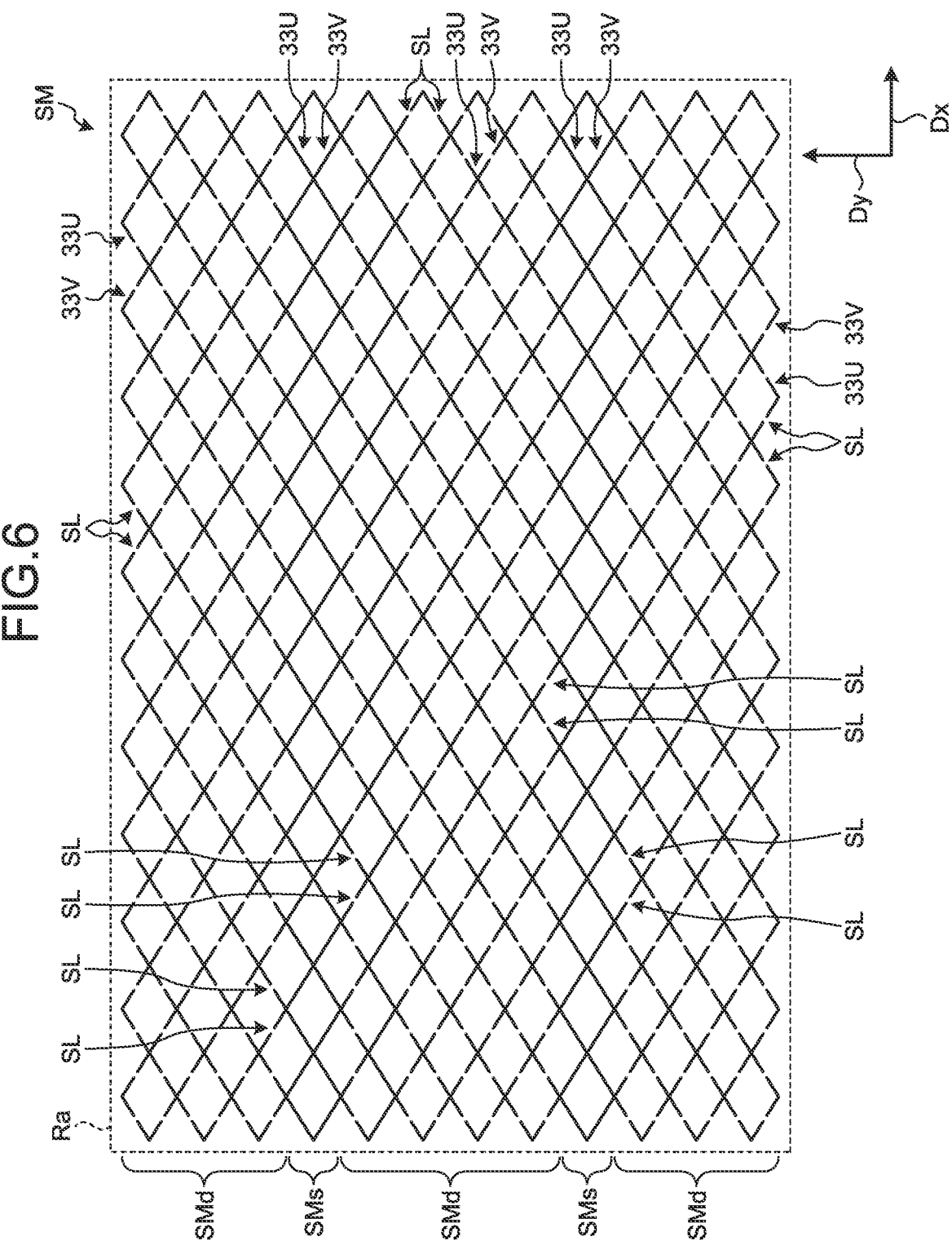
FIG. 6 is an enlarged plan view of a region Ra illustrated in FIG. 5.

FIG. 6 is an enlarged plan view of a region Ra illustrated in FIG. 5. As illustrated in FIG. 6, the wiring unit for temperature detection SM includes sensor portions SMs and dummy portions SMd. The sensor portions SMs and the dummy portions SMd extend in the first direction Dx and are alternately arranged in the second direction Dy. The sensor portions SMs are coupled to the coupling wire 34a or the coupling wire 34b illustrated in FIG. 5, and mainly function as detection electrodes. The dummy portions SMd are electrically separate from the sensor portions SMs and the coupling wires 34a and 34b. The dummy portions SMd are dummy electrodes not functioning as the detection electrodes.

The sensor portions SMs and the dummy portions SMd include the first conductive thin wires 33U and the second conductive thin wires 33V and have a similar mesh shape. This structure can prevent variations in transmittance of light in the display region AA, thereby enabling good viewability. The sensor portions SMs are electrically separate from the dummy portions SMd by slits SL provided to the first conductive thin wires 33U and the second conductive thin wires 33V. The slits SL are provided to the respective first conductive thin wires 33U and the respective second conductive thin wires 33V constituting one mesh portion of the dummy portion SMd. The slit SL or the dummy portion SMd are not necessarily provided.

As illustrated in FIG. 5, the coupling wires 34a are each coupled to a first wire 37a. The coupling wires 34b are each coupled to a second wire 37b. In other words, according to the present embodiment, the first wire 37a is coupled to one end of the wiring unit for temperature detection SM and the second wire 37b is coupled to the other end of the wiring unit for temperature detection SM. The first wire 37a is routed along the peripheral region FR. The second wire 37b is routed along the peripheral region FR.

The first wire 37a and the second wire 37b coupled to one wiring unit for temperature detection SM are coupled to different terminals 36. Specifically, the first wire 37a as the one end of the wiring unit for temperature detection SM and the second wire 37b as the other end thereof are pulled out to the flexible substrate 72 through the respective terminals 36. The first wire 37a and the second wire 37b of the wiring unit for temperature detection SM are electrically coupled to the resistance detection circuit 120 illustrated in FIG. 2 through the flexible substrate 72. The resistance detection circuit 120 detects a change in resistance in accordance with a change in temperature, between the first wire 37a as the one end of the temperature detection unit SM and the second wire 37b as the other end of the wiring unit for temperature detection SM.

The first wire 37a and the second wire 37b can be made of the same metal material or alloy as that used for the first conductive thin wires 33U and the second conductive thin wires 33V. The first wire 37a and the second wire 37b may be made of any material having good conductivity, and may be made of a material different from that of the first conductive thin wires 33U or the second conductive thin wires 33V.

The wiring unit for temperature detection SM is not limited to the configuration of mesh-like metal thin wires, and may have a configuration including zig-zag metal thin wires or wavy metal thin wires, for example. While FIG. 6 illustrates the sensor portions SMs and the dummy portions SMd included in one wiring unit for temperature detection SM, the dummy electrode may be interposed in a space SP between adjacent wiring units for temperature detection SM.

As illustrated in FIG. 4, the shield conductive layer 51 illustrated in FIG. 4 is provided to prevent electrostatic buildup when the display device 2 is manufactured or used. Without the shield conductive layer 51, electromagnetic noise such as static electricity from the outside may possibly hinder full effectiveness of suppressing electromagnetic noise due to a region without the first conductive thin wires 33U or the second conductive thin wires 33V. Further, the dummy portions SMd are in an electrically floating state, in which the dummy portions SMd are not coupled to the sensor portions SMs, the first wire 37a, or the second wire 37b. Consequently, electrification charge is hard to be removed from the dummy portions SMd. For this reason, static buildup in the polarizing plate 35 or in the dummy portions SMd may possibly change the orientation of the liquid crystal layer 8, which may lead to lower display quality.

In the first embodiment, as illustrated in FIG. 4, the shield conductive layer 51 is provided on the second substrate 31, and the sensor portions SMs and the dummy portions SMd of the wiring unit for temperature detection SM are provided on the shield conductive layer 51. In other words, the shield conductive layer 51 is interposed between the second substrate 31 and the first conductive thin wires 33U and the second conductive thin wires 33V in the direction perpendicular to the second substrate 31. As illustrated in FIG. 5, the wiring units for temperature detection SM are disposed at positions overlapping with the shield conductive layer 51 in a plan view.

The shield conductive layer 51 is in direct contact with and overlaps with the first conductive thin wires 33U and the second conductive thin wires 33V of the sensor portions SMs and the dummy portions SMd. As illustrated in FIG. 5, the shield conductive layer 51 is formed on substantially the entire surface of the second substrate 31, and provided on the entire surface of the display region AA and extending to the peripheral region FR. That is, the shield conductive layer 51 has a portion overlapping with the first conductive thin wires 33U and the second conductive thin wires 33V and a portion not overlapping with the first conductive thin wires 33U or the second conductive thin wires 33V.

The shield conductive layer 51 preferably extends to the edges of the second substrate 31. The shield conductive layer 51 is electrically coupled to a fixed potential such as a power source or the ground through a conductive tape or the like in the peripheral region FR.

The shield conductive layer 51 is preferably provided at a position overlapping with the coupling wires 34a and 34b and the first wires 37a and the second wires 37b as illustrated in FIG. 5. The area of the shield conductive layer 51 in a plan view is larger than a total of the areas of the first conductive thin wires 33U and the second conductive thin wires 33V.

A sheet resistance value of the shield conductive layer 51 is, for example, from $10^5$ $\Omega$/sq to $10^{11}$ $\Omega$/sq inclusive. More preferably, the sheet resistance value of the shield conductive layer 51 is, for example, from $10^9$ $\Omega$/sq to $10^{11}$ $\Omega$/sq inclusive. The sheet resistance value of the shield conductive layer 51 is higher than that of the first conductive thin wires 33U and the second conductive thin wires 33V. Consequently, even if the shield conductive layer 51 is coupled to a fixed potential, a change in resistance of the wiring units for temperature detection SM in accordance with a change in temperature can be detected.

The sheet resistance value of $10^5$ $\Omega$/sq or higher requires the shield conductive layer 51 to have a film thickness of 5 nm or smaller. Alternatively, one or more dispersants selected from $SiO_2$, $TiO_2$, $Ta_2O_5$, $Nb_2O_5$, and $MgF_2$ may be dispersed in the base material of the shield conductive layer 51, thereby making the sheet resistance value of the shield conductive layer 51, for example, $10^5$ $\Omega$/sq or higher. The transmittance of the base material of ITO, even if $SiO_2$ is dispersed therein, is hard to be reduced, so that the shield conductive layer 51 is preferably made of ITO, in the base material of which $SiO_2$ is dispersed.

As described above, the shield conductive layer includes: one or more base materials selected from ITO, IZO, and SnO; and one or more dispersants selected from $SiO_2$, $TiO_2$, $Ta_2O_5$, $Nb_2O_5$, and $MgF_2$. This composition allows the shield conductive layer 51 to have the sheet resistance value of $10^5$ $\Omega$/sq or higher, which can prevent a short circuit between adjacent wiring units for temperature detection SM (see FIG. 5) or between the sensor portions SMs and the dummy portion SMd.

The sheet resistance value is a resistance value between opposing two sides of a resistor having a square shape in a plan view. The sheet resistance value of the shield conductive layer 51 can be measured by a publicly known four-terminal method, for example, using a conductive layer deposited on the second substrate 31 by a sputtering method or the like.

As described above, the display device 2 according to the first embodiment includes: the second substrate 31; the wiring units for temperature detection SM provided on a plane parallel to the second substrate 31 and each including a plurality of first conductive thin wires 33U and a plurality of second conductive thin wires 33V (metal wires); and the shield conductive layer 51 in contact with and overlapping with the first conductive thin wires 33U and the second conductive thin wires 33V and interposed between the second substrate 31 and the first conductive thin wires 33U and the second conductive thin wires 33V in the direction perpendicular to the second substrate 31. The shield conductive layer 51 has a higher sheet resistance value than that of the first conductive thin wires 33U and the second conductive thin wires 33V.

Manufacturing Method

Figure 7:
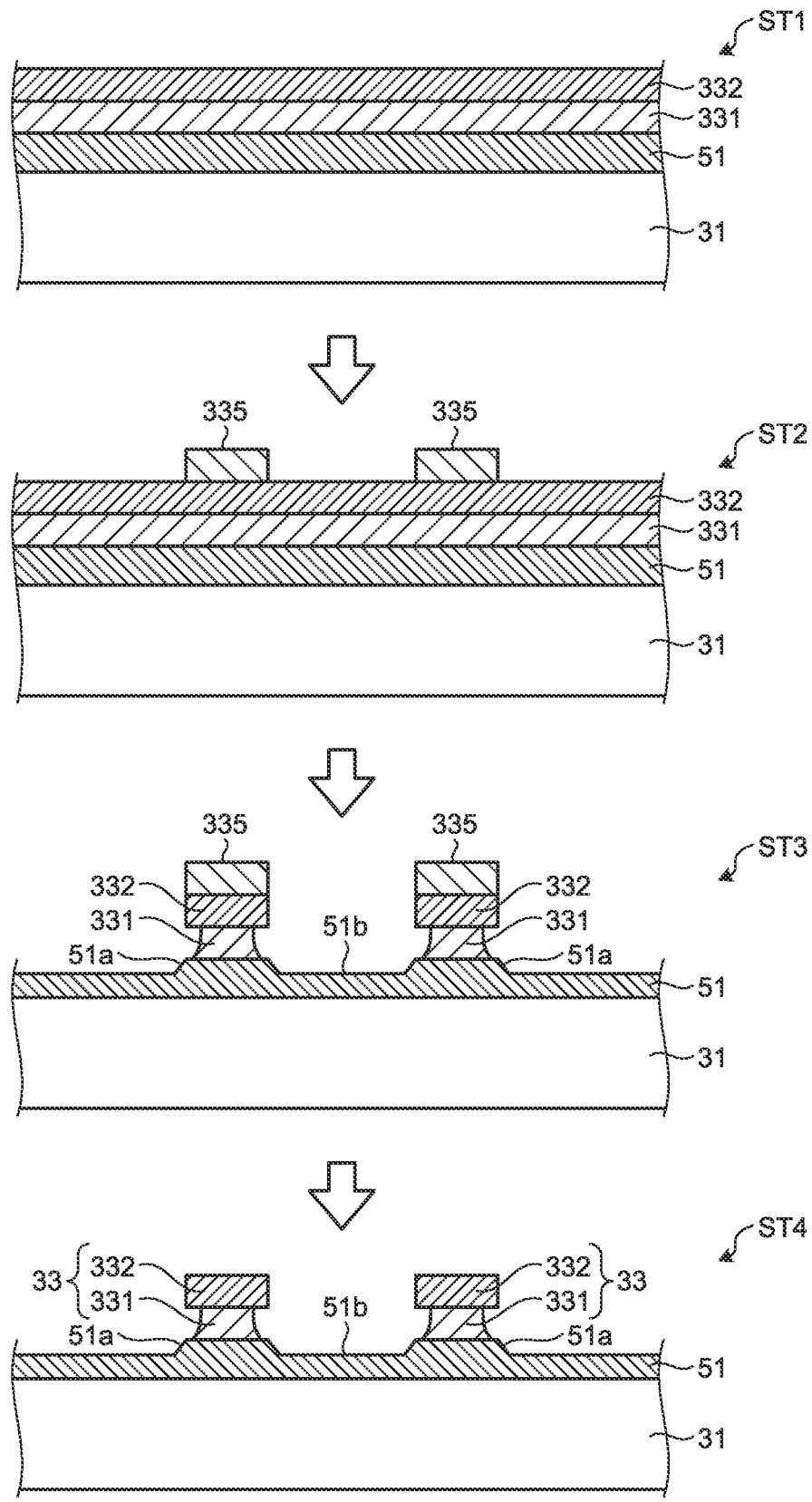
FIG. 7 is a process chart for explaining a manufacturing method of the wiring units for temperature detection according to a first embodiment of the present disclosure.

FIG. 7 is a process chart for explaining a manufacturing method of the wiring units for temperature detection according to the first embodiment. First, as illustrated in FIG. 7, the shield conductive layer 51 is formed using the material including ITO and $SiO_2$ on the upper surface of the second substrate 31, and a conductive layer 331 is formed using the metal material described above on the shield conductive layer 51. Subsequently, a conductive layer 332 is formed using the metal material described above on the conductive layer 331 (Step ST1). The film formation of the shield conductive layer 51, the conductive layer 331, and the conductive layer 332 can be sequentially performed in one process by the sputtering method or the like.

The conductive layer 331 may be a multilayered body in which at least two of the following layers are stacked: a metal layer including one or more elements selected from aluminum (Al), copper (Cu), silver (Ag), molybdenum (Mo), chromium (Cr), titanium (Ti), and tungsten (W); and a metal alloy layer including these elements. In the same manner, the conductive layer 332 may be a multilayered body in which at least two of the following layers are stacked: a metal layer including one or more elements selected from aluminum (Al), copper (Cu), silver (Ag), molybdenum (Mo), chromium (Cr), titanium (Ti), and tungsten (W); a metal alloy layer including these elements; an oxide layer composed mostly of tin oxide ($SnO_2$) and silicon dioxide ($SiO_2$); and an oxide layer composed mostly of gallium oxide ($Ga_2O_3$), indium oxide ($In_2O_3$), and tin oxide ($SnO_2$).

The material of the conductive layer 332 is selected from those having a lower reflectance than that of the conductive layer 331. With this material, the conductive layer 332 has a lower reflectance of visible light than that of the conductive layer 331 and has a color closer to black than that of the conductive layer 331 is to black.

Making the color of the conductive layer 332 closer to black than that of the conductive layer 331 increases a resistance value of the conductive layer 332. Thus, the material of the conductive layer 331 is selected from those having higher conductivity than that of the conductive layer 332. This configuration can prevent increase in power consumption in the wiring units for temperature detection SM.

Subsequently, resists 335 are formed on the conductive layer 332 (Step ST2). The resists 335 are patterned by photolithography to have patterns corresponding to the positions of the first conductive thin wires 33U and the second conductive thin wires 33V as illustrated in FIG. 5.

Part of the conductive layers 331 and 332 exposed from the resists 335 is etched and removed (Step ST3). The part of the conductive layers 331 and 332 overlapping with the resists 335 is hard to be removed by etching, and is formed as patterns of the first conductive thin wires 33U and the second conductive thin wires 33V.

Etchant for the conductive layer 331 and the conductive layer 332 needs to be changed as appropriate depending on the material. In the case of a metal film including aluminum, phosphate etchant such as phosphoric acid and acetic acid may be used. In the first embodiment, an etching rate (reduction amount of the film in contact with the etchant per unit time) of the shield conductive layer 51 is lower than that of the conductive layer 331. After the part of the conductive layer 331 and the conductive layer 332 not overlapping with the resists 335 is removed, the shield conductive layer 51 functions as an etching stopper, and stops further etching. In this case, the shield conductive layer 51 is slightly etched at portions 51b not overlapping with the resists 335, thereby forming tapered surfaces 51a.

The etching rate (reduction amount of the film in contact with the etchant per unit time) of the conductive layer 332 is lower than that of the conductive layer 331. Accordingly, the conductive layer 332 has a larger width than that of the conductive layer 331. Consequently, a width of the first conductive thin wire 33U or the second conductive thin wire 33V corresponds to a width of the conductive layer 332.

After the removal of the resists 335, the conductive thin wires 33 are patterned to be the first conductive thin wires 33U or the second conductive thin wires 33V on the shield conductive layer 51 (Step ST4). While FIG. 7 illustrates two wires of the first conductive thin wires 33U and the second conductive thin wires 33V, the process described above is simultaneously performed on the entire surface of the second substrate 31. This process forms the wiring units for temperature detection SM including the first conductive thin wires 33U and the second conductive thin wires 33V as illustrated in FIG. 5. The first conductive thin wires 33U and the second conductive thin wires 33V of the wiring units for temperature detection SM are directly stacked on the shield conductive layer 51.

Measurement of Temperature

Figure 8:
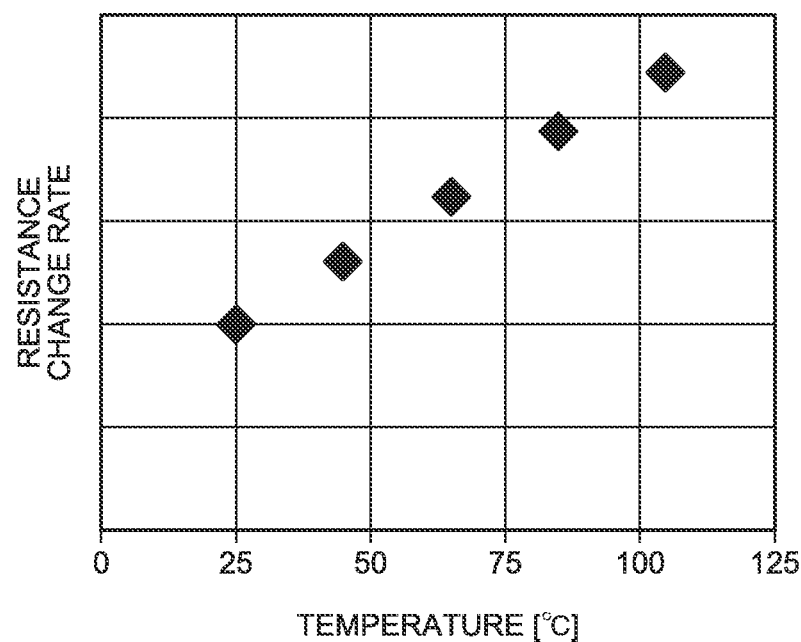
FIG. 8 is a graph illustrating a resistance change rate of one wiring unit for temperature detection with respect to a temperature.
Figure 9:
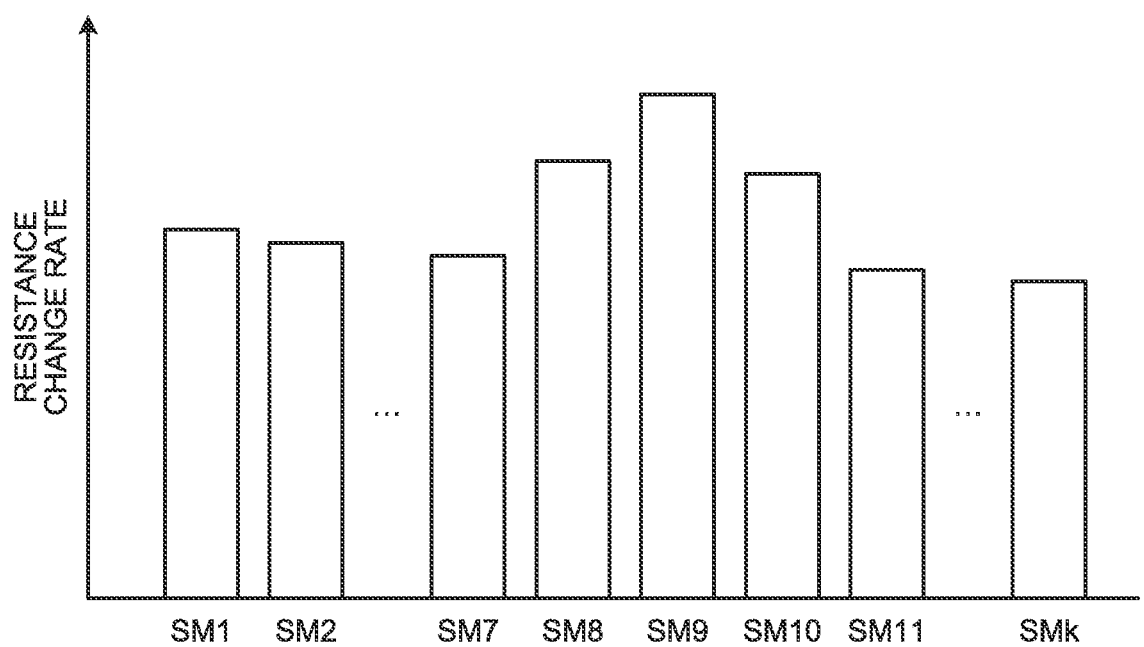
FIG. 9 is a graph for explaining an exemplary distribution of resistance change rates of the wiring units for temperature detection.

FIG. 8 is a graph illustrating a resistance change rate of one wiring unit for temperature detection with respect to temperature. FIG. 9 is a graph for explaining an exemplary distribution of resistance change rates of the wiring units for temperature detection. As illustrated in FIG. 8, the resistance change rate of the wiring unit for temperature detection SM with respect to a resistance value at a reference temperature changes linearly in accordance with a temperature, for example.

As illustrated in FIG. 1, the HUD device 1 may introduce sunlight LL through an opening 4S of the housing 4 depending on the relative position of the sun SUN. The sunlight LL is guided by the optical system RM and collected as it approaches the display device 2, and may strike part of the display region. Since the collected sunlight can deteriorate the display device, the detection of a partially heated state of the display region has been demanded.

In the first embodiment, as illustrated in FIG. 5, the wiring units for temperature detection SM are arrayed at positions overlapping with the display region AA in a plan view. With this configuration, if there is a wiring unit for temperature detection SM that has undergone a temperature rise, a position in the display region AA where the sunlight LL strikes can be grasped.

Assume that the wiring units for temperature detection SM including wiring units for temperature detection SM1 to SMk illustrated in FIG. 9 are arrayed in the direction Dy in the display region AA illustrated in FIG. 5. The resistance detection circuit 120 converts resistance values of the wiring units for temperature detection SM1 to SMk from analog to digital and outputs the detected resistance signals to the control circuit 110. As illustrated in FIG. 9, when the resistance change rate of the wiring unit for temperature detection SM9 is higher than that of the wiring units for temperature detection SM1 to SM7 and SM11 to SMk by a certain threshold or more, the control circuit 110 can determine that the region where the sunlight LL strikes is a region overlapping with the wiring unit for temperature detection SM9 in the display region AA.

Meanwhile, when the sunlight LL strikes the wiring unit for temperature detection SM, the sunlight LL may be reflected at the wiring unit for temperature detection SM. As illustrated in FIG. 1, even if the mounting positon of the display device 2 is adjusted so that the regular reflection of the sunlight LL does not return to the windshield WS, light diffracted at the first conductive thin wires 33U and the second conductive thin wires 33V may possibly reach the windshield WS.

In the first embodiment, the wiring units for temperature detection SM of the display device 2 are disposed at positions overlapping with the second substrate 31 having the display region, and more specifically, disposed at positions overlapping with the display region AA in a plan view. The wiring units for temperature detection SM include the first conductive layer 331 stacked above the second substrate 31 and the second conductive layer 332 stacked on the first conductive layer 331. The second conductive layer 332 has a lower reflectance of visible light than that of the first conductive layer 331. This configuration prevents diffraction of light at the wiring units for temperature detection SM even when the sunlight LL strikes the wiring units for temperature detection SM. This improves the display quality of the image VI recognized within the field of view of the user H illustrated in FIG. 1.

Since the width of the second conductive layer 332 is larger than the width of the first conductive layer 331 as illustrated in FIG. 7, light reflected at the first conductive layer 331 is covered by the second conductive layer 332, thereby preventing the diffraction of light at the wiring units for temperature detection SM.

First Modification of First Embodiment

The material of the shield conductive layer 51 is not limited to ITO. The material of the shield conductive layer 51 is, for example, a conductive material having a carbon nanotube structure and having a visible light transmittance of 90% or higher. The sheet resistance of the shield conductive layer 51 is, for example, from $10^5$ Ω/sq to $10^{11}$ Ω/sq inclusive. The conductive material with the carbon nanotube structure is less susceptible to light-induced resistance change than ITO. If heat and light simultaneously act on the shield conductive layer 51 and the wiring units for temperature detection SM, the resistance change in accordance with temperature change due to light is prevented, and the detection accuracy of the resistance change in accordance with a temperature changed by heat is increased.

Second Modification of First Embodiment

The material of the shield conductive layer 51 is, for example, a conductive polymeric material such as poly-3, 4-ethylenedioxythiophene (PEDOT). The sheet resistance of the shield conductive layer 51 is, for example, form $10^5$ Ω/sq to $10^{11}$ Ω/sq inclusive. The conductive polymeric material is less susceptible to light-induced resistance change than ITO. If heat and light simultaneously act on the shield conductive layer 51 and the wiring units for temperature detection SM, the resistance change in accordance with temperature change due to light is prevented, and the detection accuracy of the resistance change in accordance with a temperature changed by heat is increased.

Third Modification of First Embodiment

The material of the shield conductive layer 51 is, for example, antimony-doped tin oxide (ATO). The sheet resistance of the shield conductive layer 51 is, for example, from $10^5$ Ω/sq to $10^{11}$ Ω/sq inclusive. The ATO conductive material is less susceptible to light-induced resistance change. If heat and light simultaneously act on the shield conductive layer 51 and the wiring units for temperature detection SM, the resistance change in accordance with temperature change due to light is prevented, and the detection accuracy of the resistance change in accordance with a temperature changed by heat is increased.

Second Embodiment

Figure 10:
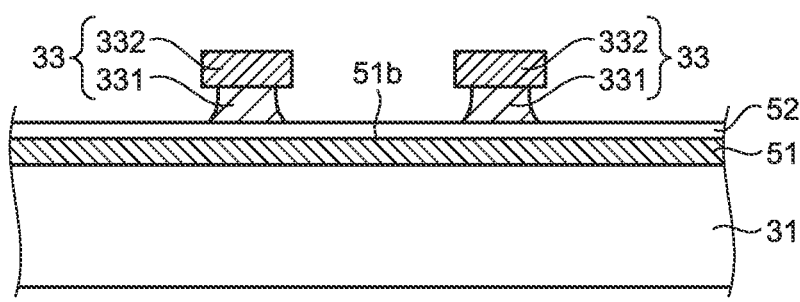
FIG. 10 is a sectional view for explaining a wiring unit for temperature detection according to a second embodiment of the present disclosure.

FIG. 10 is a sectional view of a wiring unit for temperature detection according to a second embodiment. The same constituent elements described in the first embodiment are denoted by the same reference signs, and overlapping explanation thereof is omitted.

In the second embodiment, an insulating layer 52 is formed on the shield conductive layer 51. The conductive layer 331 is formed on the insulating layer 52. The conductive layer 332 is formed on the conductive layer 331. With this configuration, the insulating layer 52 insulates the shield conductive layer 51 from the conductive thin wires 33 serving as the first conductive thin wires 33U or the second conductive thin wires 33V. In other words, the insulating layer 52 insulates the shield conductive layer 51 from the wiring units for temperature detection SM. As a result, simultaneous acting of heat and light on the shield conductive layer 51 and the wiring units for temperature detection SM may cause the resistance change in accordance with temperature change due to light, but have no effect on the resistance change in accordance with a temperature changed by heat in the wiring units for temperature detection SM.

Third Embodiment

Figure 11:
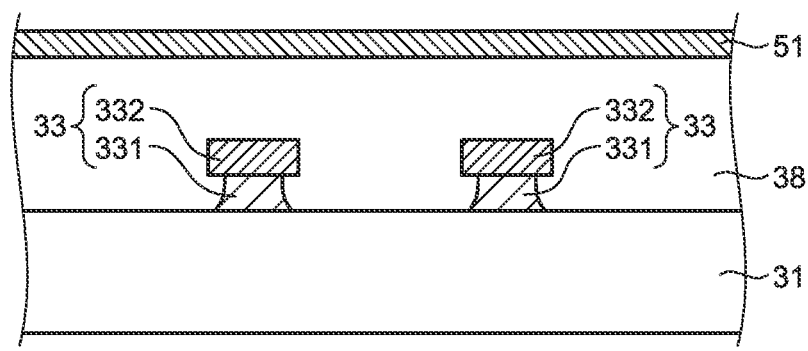
FIG. 11 is a sectional view for explaining a wiring unit for temperature detection according to a third embodiment of the present disclosure.

FIG. 11 is a sectional view for explaining a wiring unit for temperature detection according to a third embodiment. The same constituent elements described in the first embodiment are denoted by the same reference signs, and overlapping explanation thereof is omitted.

In the third embodiment, the conductive layer 331 is formed on the second substrate. The conductive layer 332 is formed on the conductive layer 331. The protection layer 38 is formed on the conductive layers 331 and 332. The protection layer 38 is made of a translucent resin, such as an acrylic resin having insulation properties. The shield conductive layer 51 is formed on the protection layer 38. In other words, the wiring units for temperature detection SM and the shield conductive layer 51 are disposed above the second substrate 31, and the wiring units for temperature detection SM are stacked below the shield conductive layer 51. This configuration prevents the shield conductive layer 51 from being etched during the formation of the conductive layers 331 and 332 as described in the first embodiment, and thus increases the quality of the shield conductive layer 51 and increases the accuracy of thickness. The protection layer 38 insulates the shield conductive layer 51 from the wiring units for temperature detection SM. As a result, simultaneous acting of heat and light on the shield conductive layer 51 and the wiring units for temperature detection SM may cause the resistance change in accordance with temperature change due to light, but have no effect on the resistance change in accordance with a temperature changed by heat in the wiring units for temperature detection SM.

The present invention can naturally provide other advantageous effects that are provided by the aspects described in the embodiments above and are clearly defined by the description in the present specification or appropriately conceivable by those skilled in the art.

While exemplary embodiments according to the present disclosure have been described, the embodiments are not intended to limit the present disclosure. The contents disclosed in the embodiments are given by way of example only, and various changes may be made without departing from the spirit of the present disclosure. Appropriate changes made without departing from the spirit of the present disclosure naturally fall within the technical scope of the present disclosure.

While a liquid crystal panel exemplifies the display device 2 in the above description, the display device 2 may be an organic electroluminescence (EL) panel or a micro light-emitting diode (LED) display that displays an image by emitting different light rays from different LEDs. The LEDs each have a size from 3 μm to 100 μm inclusive in a plan view.

What is claimed is:

1. A head-up display device comprising:
   a backlight;
   a display device provided above the back light; and
   an optical system provide above the display device, wherein
   the display device including:
     a substrate;
     a shield conductive layer;
     a plurality of wiring units that are for temperature detection; and
     an insulating layer,
   the shield conductive layer is provided above a surface of the substrate on an optical system side, and
   the wiring units are stacked on the shield conductive layer with the insulating layer interposed therebetween, so that the wiring units and the shield conductive layer are insulated from each other.

2. The head-up display device according to claim 1, wherein
   the display device has a display region, and
   the wiring units are disposed at a position overlapping the display region when seen in a plan view.

3. The head-up display device according to claim 1, each wiring unit has one end coupled to a first wire and the other end coupled to a second wire, to detect resistance that changes in accordance with a change in temperature, between the first wire and the second wire.

4. The head-up display device according to claim 1, wherein the shield conductive layer has a higher sheet resistance value than that of the wiring units.

5. The head-up display device according to claim 1, wherein the shield conductive layer includes one or more base materials selected from the group consisting of ITO, IZO, and SnO and includes one or more dispersants selected from the group consisting of $SiO_2$, $TiO_2$, $Ta_2O_5$, $Nb_2O_5$, and $MgF_2$.

6. The head-up display device according to claim 1, wherein the shield conductive layer is made of one or more materials selected from the group consisting of a conductive material with a carbon nanotube structure, PEDOT, and antimony-doped tin oxide.

* * * * *